US012142391B2

(12) United States Patent
Drab

(10) Patent No.: US 12,142,391 B2
(45) Date of Patent: Nov. 12, 2024

(54) DEVICE AND METHOD FOR TWISTING SINGLE CABLES

(71) Applicant: komax Holding AG, Dierikon (CH)

(72) Inventor: Michael Drab, Unteraegeri (CH)

(73) Assignee: komax Holding AG, Dierikon (CH)

( * ) Notice: Subject to any disclaimer, the term of this patent is extended or adjusted under 35 U.S.C. 154(b) by 239 days.

(21) Appl. No.: 17/979,824

(22) Filed: Nov. 3, 2022

(65) Prior Publication Data

US 2023/0132636 A1 May 4, 2023

(30) Foreign Application Priority Data

Nov. 4, 2021 (EP) .................................... 21206481

(51) Int. Cl.
*B21F 7/00* (2006.01)
*H01B 13/02* (2006.01)

(52) U.S. Cl.
CPC ........... *H01B 13/0207* (2013.01); *B21F 7/00* (2013.01); *H01B 13/0271* (2013.01)

(58) Field of Classification Search
CPC . B21F 7/00; B21F 15/02; B21F 15/04; H01B 13/0207; H01B 13/0278
See application file for complete search history.

(56) References Cited

U.S. PATENT DOCUMENTS

| | | | | |
|---|---|---|---|---|
| 6,167,919 | B1 | 1/2001 | Fuechsl et al. | |
| 2009/0241314 | A1* | 10/2009 | Watanabe .......... | H01B 13/0271 29/33 F |
| 2019/0214166 | A1* | 7/2019 | Shirai .................... | H01B 13/02 |
| 2019/0314885 | A1* | 10/2019 | Staubli ............... | H01B 13/0036 |

FOREIGN PATENT DOCUMENTS

| | | | | |
|---|---|---|---|---|
| DE | 196 31 770 A1 | 2/1998 | | |
| DE | 10 2016 109 152 B3 | 9/2017 | | |
| DE | 102017109791 A1 * | 11/2018 | ................ | B21F 7/00 |
| EP | 1 032 095 A2 | 8/2000 | | |
| EP | 0 917 746 B1 | 12/2000 | | |
| JP | 2008-277033 A | 11/2008 | | |
| JP | 2010-123294 A | 6/2010 | | |
| WO | 98/06155 A1 | 2/1998 | | |
| WO | 2012/015057 A2 | 2/2012 | | |

OTHER PUBLICATIONS

European Search Report dated Apr. 13, 2022 in European Application No. 21206481.0 with English translation of relevant parts.
European Search Report dated Apr. 4, 2022 in European Application No. 21206482.8 with English translation of relevant parts.

* cited by examiner

*Primary Examiner* — Debra M Sullivan
(74) *Attorney, Agent, or Firm* — Collard & Roe, P.C.

(57) ABSTRACT

A device and a method twist single cables about a twisting axis to form a cable bundle along an extension axis. The device includes single rotating units, which are spaced from one another at a variable distance, for separately holding cable ends at one end of the single cables, wherein each single rotating unit is mounted rotatably about an associated pivot axis, wherein each pivot axis runs substantially perpendicular to the extension axis of the cable bundle; a twisting unit for holding and twisting cable ends at the other end of the single cables; and a distance-adjusting apparatus for adjusting the variable distance.

12 Claims, 9 Drawing Sheets

DEVICE AND METHOD FOR TWISTING SINGLE CABLES

CROSS REFERENCE TO RELATED APPLICATIONS

Applicant claims priority under 35 U.S.C. § 119 of European Application No. 21206481.0 filed Nov. 4, 2021, the disclosure of which is incorporated by reference.

BACKGROUND OF THE INVENTION

1. Field of the Invention

The present disclosure relates to a device and a method for twisting single cables, in particular for twisting single cables in pairs, to form a cable bundle.

2. Description of the Related Art

Cable bundles, which are obtained by twisting single cables, are required in various industrial fields of application. Before twisting, the single cables are usually cut, i.e., shortened, to a certain length and where necessary also finished, i.e., provided with a contact part or the like.

With some conventional devices and methods according to the prior art, the cable pair consisting of the single cables is clamped between a holding unit at one cable end and a twisting unit at the other cable end and twisted by rotating the twisting unit. The resulting shortening of the cable pair is compensated by a longitudinal displacement of the twisting unit. A corresponding device is disclosed for example in EP 1 032 095 A2. With this type of conventional devices and methods, the single cables are torsioned, i.e., rotate about their own single cable axis.

EP 0 917 746 A1 discloses a device which allows cable pairs to be twisted without impermissibly torsioning the single cables. In this case, the holding unit is replaced by untwisting units, which each grip the single cables individually at one cable end (the trailing end). A longitudinally displaceable guiding apparatus separates the two single cables with a guiding mandrel and moves in the direction of the untwisting units during the twisting process. The lay length can be kept constant thereby.

DE 10 2017 109 791 A1 discloses a device having untwisting units which are oriented parallel to one another at the start of a twisting process and are pivoted inwards in a motorised manner during the twisting process. The pivot angle is increased continuously during the twisting process by a control apparatus.

Problem to be Solved

With the device known from DE 10 2017 109 791 A1, it is possible to keep the untwisted region of the cable ends at the untwisting units short, i.e., to obtain comparatively little untwisted cable. However, further shortening of the untwisted region is limited, inter alia, by the fact that the cable ends are impermissibly kinked at large inward-pivoting angles.

SUMMARY OF THE INVENTION

Aspects of the present disclosure address the aforementioned problem. According to one aspect, a device according to the invention and a method according to the invention are provided. Further aspects, features, developments and advantages can be found below and in the attached drawings.

According to one aspect, a device for twisting single cables about a twisting axis to form a cable bundle along an extension axis comprises single rotating units, a twisting unit and a distance-adjusting apparatus. The single rotating units (individual rotating units) are spaced from one another at a variable distance. The single rotating units are configured to hold, for example grip, cable ends separately at one end of the single cables. Each single rotating unit is mounted rotatably about an associated pivot axis. Each pivot axis runs substantially perpendicular to the extension axis of the cable bundle. The twisting unit is configured to hold and twist cable ends at the other end of the single cables. The distance-adjusting apparatus is configured to adjust the variable distance.

The adjustability of the variable distance means that impermissible kink angles (bending angles) of the single cables at the untwisted cable end can be avoided, in particular at the end of the twisting process, as a result of which the untwisted region can be shortened further. An improved yield of the twisted cable bundle results.

In embodiments, the single rotating units are mechanically coupled such that the pivot angle resulting between the single rotating units is substantially always formed equally by the single rotating units. Here, an adjustable movable stop for a stop element provided on at least one of the single rotating units can additionally be provided, wherein the movable stop is defined to limit the pivot angle such that contact between elements of the single rotating units, in particular gripper tips of single twisting grippers of the single rotating units, at a given distance between the single rotating units, is avoided or prevented. The movable stop can also be moved such that the single rotating units assume (i.e., achieve, take on) a parallel position relative to one another.

In an alternative embodiment, a separate pivot drive is provided for each single rotating unit. The pivot drives are configured such that they jointly permit a controlled definition of the pivot angle resulting between the single rotating units.

In both variants, the pivot angle relative to the respective angle at which the single cables run out at the single rotating units in the direction of the twisting unit is assumed to be appropriate and equal, i.e., substantially the same on both sides, so that a uniform lay of the twisted cable bundle results. In addition, the distance between the single rotating units is variable during the twisting process, as a result of which the lay can be made even more uniform. Moreover, it is possible to reduce the distance further in order to carry out a final twisting process following the actual twisting process.

In embodiments, a control apparatus is provided for the program-controlled and/or user-controlled definition of the variable distance. The control apparatus is configured, for example, such that it further reduces the variable distance between the single rotating units in order to carry out the final twisting process.

According to a further aspect, a method for twisting single cables about a twisting axis to form a cable bundle along an extension axis is provided and uses the device described herein. The method comprises: separately holding cable ends at one end of the single cables by means of the single rotating units; holding cable ends at the other end of the single cables by means of the twisting unit; rotating the twisting unit to carry out a twisting process; and adjusting the variable distance by means of the distance-adjusting apparatus.

In embodiments, the method comprises, before separately holding the cable ends, bringing the single rotating units into a predefined distance from one another; pivoting the single rotating units into a parallel position; and receiving the cable ends at the single rotating units.

In embodiments, the adjustment of the variable distance during the twisting process comprises reducing the variable distance. In embodiments, the reduction of the variable distance is continued after completion of the twisting process in order to carry out a final twisting process.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
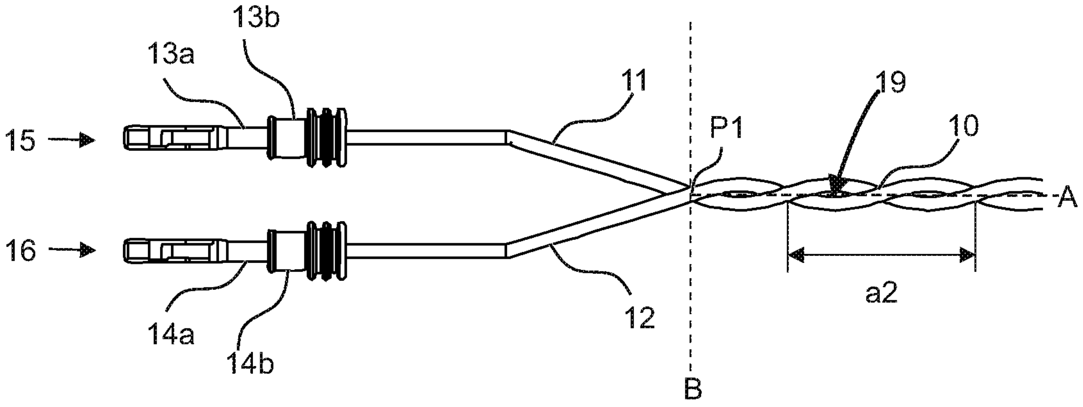
FIG. 1 shows a schematic diagram of a region of a cable bundle to illustrate terms used herein.

FIG. 1 shows a schematic diagram of a region of a cable bundle, which is denoted as a whole by 10. The cable bundle comprises a single cable 11 and a single cable 12, as a cable pair. It should be noted that the number of two single cables 11, 12 is exemplary and non-limiting and that the aspects and features described herein can also be applied in full or in part to cable bundles having more than two single cables 11, 12, and identical or similar effects result. In embodiments, two single cables 11, 12 can nevertheless be used for one cable bundle 10.

In FIG. 1, a first cable end 15 of the single cable 11 and a first cable end 16 of the single cable 12 are located on the same side. By way of example, the first cable ends 15, 16 are already finished, in the present case in the form of a contact 13*a* and a sleeve 13*b* on the first cable end 15 and a contact 14*a* and a sleeve 14*b* on the second cable end 16. In a region to the right of the dashed line labelled B in FIG. 1, the single cables 11, 12 are twisted, as a result of which there are points at which the single cables 11, 12 intersect in a projection plane, for example in the drawing plane of FIG. 1. In the twisted region to the right of the line B, the cable bundle 10 runs along an extension axis A.

Twisted as used herein means a state in which the cables 11, 12 wrap around one another, i.e. are entwined. An identical intersection in the projection plane is present when there is the same sequence of single cables at two intersections in the direction perpendicular to the projection plane. The distance between two adjacent identical intersections is referred to as the twisting lay length or also simply as the lay length for short and is denoted by a2. Two eyelets 19 result in the projection plane between two adjacent identical intersections and should be as small as possible for a high-quality cable bundle 10.

The designations from FIG. 1 are transferred to the following paragraphs and are not described again.

Figure 2:
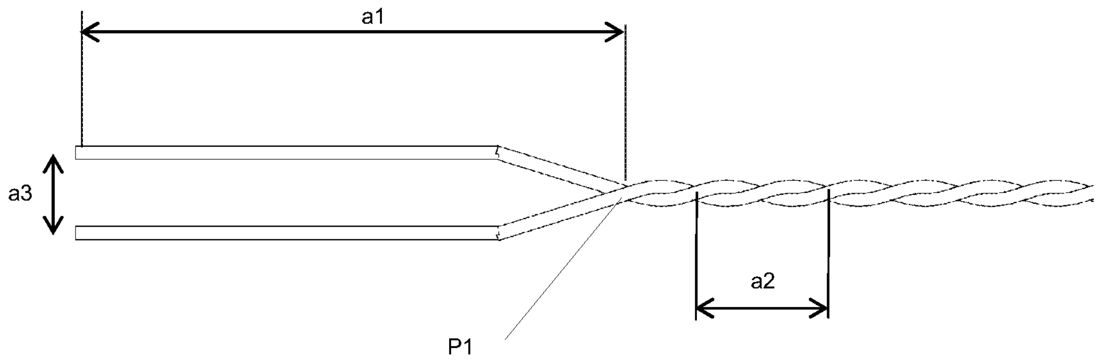
FIG. 2 shows a region of the cable pair of FIG. 1 with further aspects for illustration.

A portion of the cable pair 10 is shown again in FIG. 2 for illustration. The untwisted ends of the single cables 11, 12 have a length a1 to a first intersection point P1, at which the twisted region begins. The distance between two identical intersections or crossovers of the cables 11, 12 in the twisted region is specified as the lay length a2, as described above.

The distance a3 is defined in a direction substantially perpendicular to the running direction of the cable pair 10 in which the distances a1, a2 are defined. The distance a3 defines the spacing of the single cables 11, 12, in this case for example at the end at which the untwisted single cables 11, 12 are present.

Figure 3:
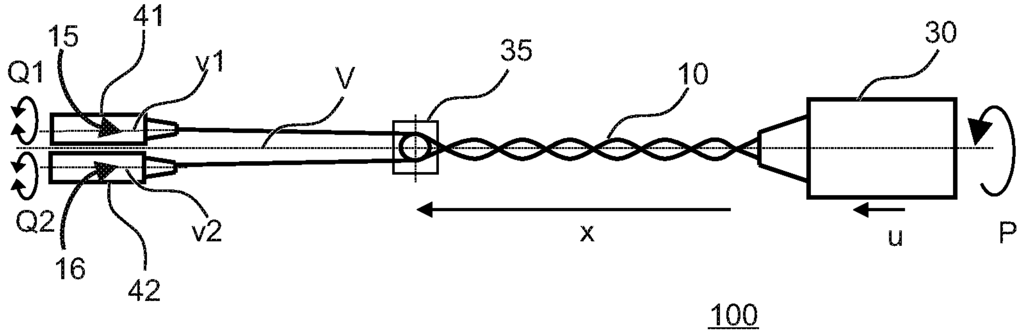
FIG. 3 shows a schematic diagram of a twisting apparatus with a twisting unit and in each case one single rotating unit per single cable, to illustrate terms and processes used herein.

FIG. 3 shows a schematic diagram of a general twisting device 100 having a twisting unit 30, single rotating units 41, 42, which are each provided for one single cable 11, 12, and a guiding apparatus 35. For illustration purposes, the cable bundle 10 of FIGS. 1 and 2 is shown clamped in the twisting device 100 according to FIG. 3. The single cable 11 is clamped at its trailing end into the single rotating unit 41. This end is also referred to below as the first end 15 of the single cable 11. The single cable 12 is clamped at its trailing end into the single rotating unit 42. This end is also referred to below as the first end 16 of the single cable 12.

The single rotating unit 41 is arranged such that it holds the first end 15 of the clamped single cable 11 along its cable axis v1 at the first end 15. The single rotating unit 42 is arranged such that it holds the first end 16 of the clamped single cable 12 along its cable axis v2 at the first end 16. Each single rotating unit 41, 42 can be rotated about the respective cable axis v1, v2 of the single cable 11, 12 which is clamped into the respective single rotating unit 41, 42, at least in a direction which effects untwisting (untorsioning) of the respective single cable 11, 12. Preferably, each single rotating unit can be rotated either forwards or backwards as desired about the respective cable axis v1, v2, which is indicated in FIG. 3 with a double arrow Q1 and Q2, respectively. Each single rotating unit 41, 42 can also be referred to below as an untwisting unit.

Untwisting (untorsioning) as used herein comprises for example reducing or eliminating a torsional force or torsional moment which would be generated in each single cable 11, 12 by the joint rotation. Untorsioning or untwisting does not necessarily have to be carried out fully to achieve the advantages described herein. I.e., over the course of the twisting process, the (total) rotation angle of the twisting unit 30 can be smaller than the (total) rotation angle of the single rotating units 41, 42.

The guiding apparatus 35 is used to separate the single cables 11, 12 at least in some regions, during most of the twisting process in a region in which there is the transition from the untwisted region to the twisted region, i.e., approximately at line B of FIG. 1. The guiding apparatus 35 can be guided or displaced in a controlled manner during a twisting process, in a direction x substantially parallel to a twisting axis V. The twisting axis V is generally identical to the extension axis A.

The twisting unit 30 is configured such that it can rotate about a twisting axis V in a twisting direction P in order to carry out a twisting process. In other words: The twisting unit 30 can be driven in rotation about the twisting axis V so that it rotates in the twisting direction P in order to carry out a twisting process. To compensate the shortening of the single cables 11, 12 wrapping around one another during the twisting process, the twisting unit 30 is displaceable in a direction u substantially parallel to the twisting axis V. A direction running parallel to the twisting axis V as used herein also includes the direction on the twisting axis V itself.

Figure 4:
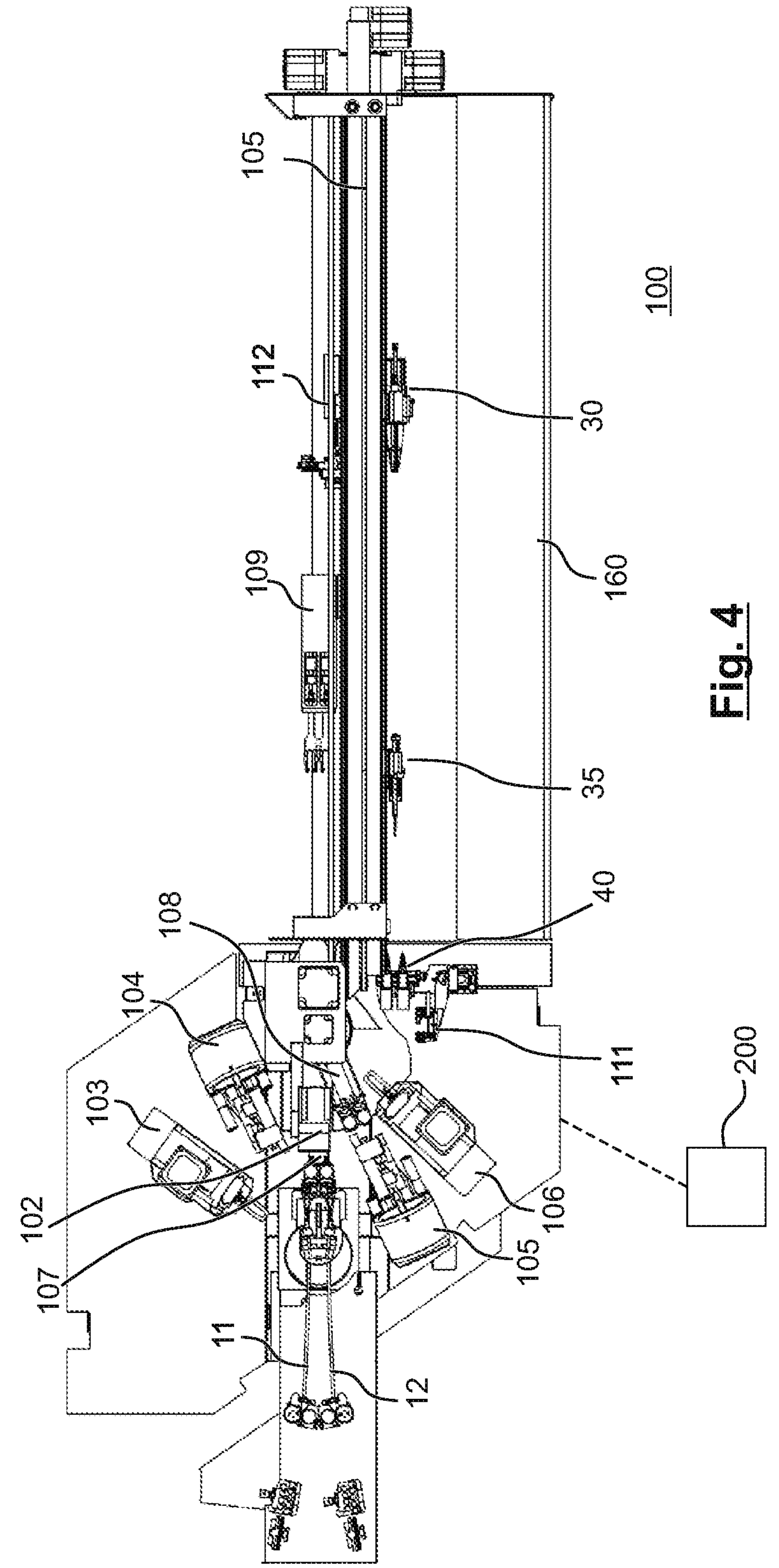
FIG. 4 shows a schematic side view of a device for twisting single cables according to an embodiment.

FIG. 4 shows a schematic side view of a device 100 for twisting the single cables 11, 12 to form a cable bundle 10, to illustrate an embodiment. It should be noted that the constituents and processes discussed in connection with FIG. 4 do not necessarily have to be carried out in their entirety for the implementation of the present invention.

In FIG. 4, the single cables 11, 12 are fed by their respective leading ends to processing modules 103, 104, 105, 106, which perform manipulations on the cables 11, 12. For example and without limitation, the leading ends of the single cables 11, 12 are each stripped of insulation by means of a cutting head 102 and fed successively by means of a first pivot unit 107 to processing modules 103, 104. Here, for example, the contacts 13*a*, 14*a* and the sleeves 13*b*, 14*b* of FIG. 1 are mounted on the respective conductor ends of the single cables 11, 12. Then the first pivot unit 107 pivots the cable pair 10 back again, and the leading ends of the single cables 11, 12 can be gripped by an extension slide 109. The single cables 11, 12 are extended, depending on the desired cable length, by the extension slide along a guide rail 105 in the linear guiding direction defined by the guide rail 105.

The single cables 11, 12 are then gripped by a second pivot unit 108 and severed and stripped of insulation by the cutting head 102. The trailing conductor ends are fed by the second pivot unit 108 to the processing modules 105, 106 on the other side and fully finished, i.e., for example provided again with a sleeve and a contact.

A transfer module 111 receives the trailing end 17 of the single cables 11, 12, brings it to a smaller distance, and transfers it after a pivoting movement individually to the respective single rotating unit 41, 42, which are combined in an untwisting apparatus 40. A transfer module 112 transfers the leading end 16 of the single cables 11, 12 to the twisting unit 30, which is also referred to as twisting head. To carry out the actual twisting process, the twisting unit 30 is rotated, as already described above with reference to FIG. 3. The twisting unit can simultaneously be moved in the direction of the untwisting unit 40 with controlled tensile force during the twisting process.

A control unit 200 controls some or all of the elements of the device 100.

Figure 5:
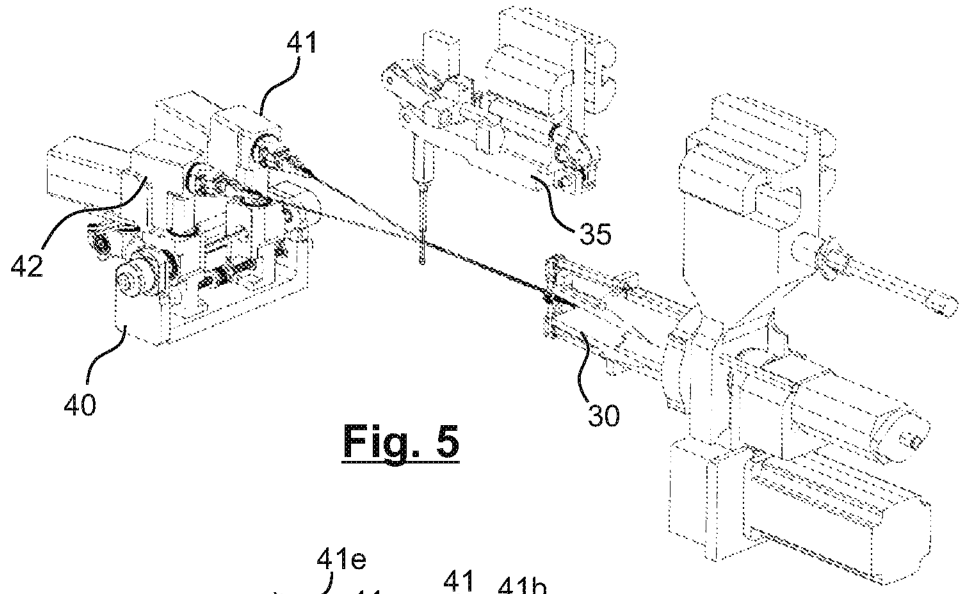
FIG. 5 shows a schematic three-dimensional view of individual components of the device 100 of FIG. 4.

FIG. 5 shows a schematic three-dimensional view of individual components of the device 100 of FIG. 4; for better comprehensibility, other components of the device 100 are not shown in FIG. 5. FIG. 4 shows the untwisting unit 40, the guiding apparatus 35 and the twisting unit 30.

Figure 6:
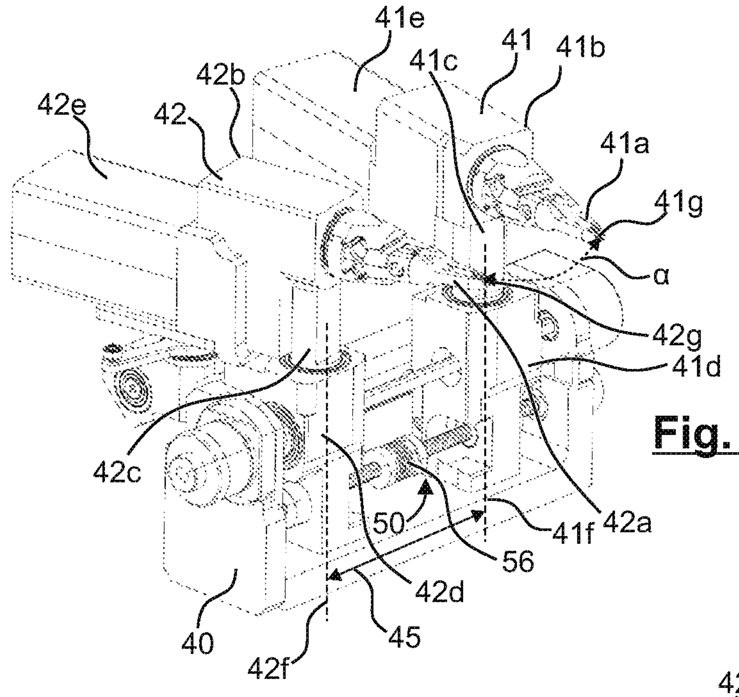
FIG. 6 shows an untwisting unit according to an embodiment in an enlarged view.

FIG. 6 shows an untwisting unit 40 according to an embodiment in an enlarged view. The untwisting unit 40 comprises a first single rotating unit 41 having an associated first single rotating gripper 41*a* and a second single rotating unit 42 having an associated second single rotating gripper 42*a*. The first single rotating gripper 41*a* is mounted rotatably in a first spindle housing 41*b*. The second single rotating gripper 42*a* is mounted rotatably in a second spindle housing 42*b*. The first single rotating gripper 41*a* can be set in rotation by means of a first untwisting motor 41*e*. The second single rotating gripper 42*a* can be set in rotation by means of a second untwisting motor 42*e*. The first spindle housing 41*b* is fastened to a first housing support 41*c*. The second spindle housing 42*b* is fastened to a second housing support 42*c*.

The first housing support 41*c* is mounted pivotably about a first pivot axis 41*f* in a first support housing 41*d*. The second housing support 42*c* is mounted pivotably about a second pivot axis 42*f* in a second support housing 42*d*. The pivot axes 41*f*, 42*f* run substantially parallel to one another. Each pivot axis 41*f*, 42*f* runs substantially perpendicular to the extension axis A of the cable bundle 10.

The distance 45 between the support housings 41*d*, 42*d* in a direction parallel to the pivot axes 41*f*, 42*f* is variable. For simplicity, the distance 45 is also referred to herein as the distance between the single rotating units 41, 42. To change the distance 45, the support housings 41*d*, 42*d* are displaceable relative to one another along a linear guide at right angles to the extension axis A by means of a distance-adjusting apparatus 50. In the embodiments shown herein, the constituents of the distance-adjusting apparatus 50 are formed by two spindles, a coupling piece 56 and a spindle drive, by way of example. The two spindles are coupled to one another with a coupling piece 56. The spindle drive (not shown) is coupled suitably to the coupled spindles. One of the spindles is right-handed and the other of the spindles is left-handed, which results in an adjustment of the distance 45 which is symmetrical relative to the extension axis A when the spindles thus coupled are driven.

The shortest distance between a tip 41*g* of the first single rotating gripper 41*a* and a tip 42*g* of the second single rotating gripper 42*a* depends on the one hand on the distance 45 between the single rotating units 41, 42 and on the other hand on a pivoting angle α defined by a pivot about the respective pivot axes 41*f*, 42*f*.

An adjustment of the distance 45 is carried out by means of the control apparatus 200, for example. The distance 45 can take place, for example following the sequence of a method in the course of which a twisting process is carried out, in a program-controlled, user-controlled or program-controlled and user-controlled manner.

Figure 7:
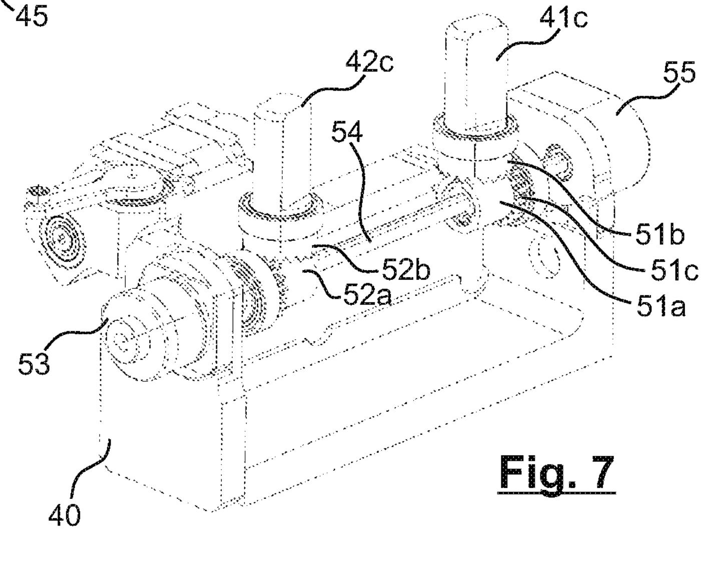
FIG. 7 shows parts of the untwisting unit of FIG. 6.

FIG. 7 shows parts of the untwisting unit 40 of FIG. 6; the single rotating units 41, 42 are omitted for better clarity. The first housing support 41*c* comprises a first gear piece 51*b*, which meshes with a first gear counter piece 51*c*. The first gear counter piece 51*c* is fastened to a first bushing 51*a*, which is mounted on a spline shaft 54. The second housing support 42*c* comprises a second gear piece 52*b*, which meshes with a second gear counter piece 52*c*. The second gear counter piece 52*c* is fastened to a second bushing 52*a*, which is mounted on the spline shaft 54.

The spline shaft 54 can be displaced longitudinally in the bushings 51*a*, 52*a*. When displaced longitudinally in this manner, the rotation of the spline shaft 54 is transferred to the respective bushing 51*a*, 52*a*. Because of the meshing of the respective gear pieces 51*b*, 52*b* with the respectively associated gear counter piece 51*c*, 52*c*, the housing supports 41*c*, 42*c* pivot by an absolute value of equal amount but in opposite directions. This pivoting movement changes the angle α.

In the embodiment described, a change in the angle α, i.e., a pivoting of the single rotating units 41, 42, takes place during operation by the tensile force which is exerted on the single rotating units 41, 42 by the cables clamped into the single rotating grippers 41*a*, 42*a*. The angle α thereby results readily from the geometric conditions, as a result of which an active control of the angle α by means of further actuators is not necessary. To this end, the first single rotating gripper 41*a* is advantageously mounted such that it can rotate correspondingly smoothly in the first spindle housing 41*b*, and the second single rotating gripper 42*a* is advantageously mounted such that it can rotate correspondingly smoothly in the second spindle housing 42*b*.

An angle sensor 55 is provided to measure the angle α and to output an angle measurement signal. A brake 53, which can be operated electromagnetically, for example, is actuated according to the angle measurement signal in order to lock the single rotating units 41, 42 in a fixed or fixable angle α to one another depending on the angle measurement signal. The actuation is carried out for example by the control unit 200.

Figure 8:
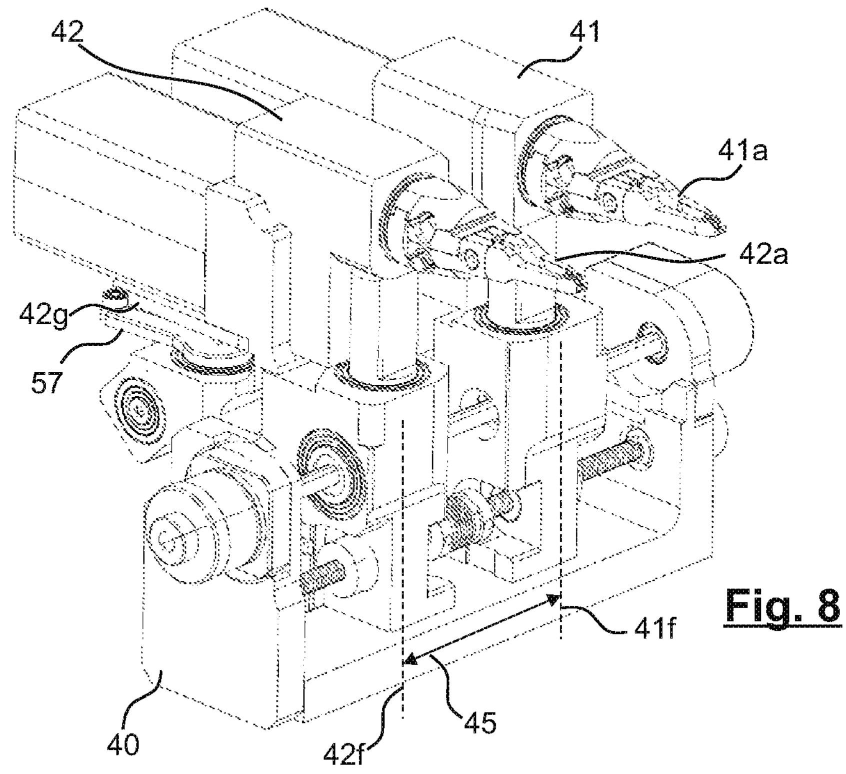
FIG. 8 shows a parallel position of the single rotating units.

Before the twisting process can begin, the cable ends of the single cables 11, 12 are transferred to the untwisting grippers 41*a*, 42*a* of the single rotating units 41, 42. For this, there must be both a defined distance 45 and a defined angle α; the single rotating units 41, 42 must be oriented parallel to one another for this. FIG. 8 shows such a parallel position of the single rotating units 41, 42; here, the distance 45 corresponds to the defined distance 45 at which a transfer of the cable ends of the single cables 11, 12 to the untwisting grippers 41*a*, 42*a* is possible. Such a position (distance and angle position) of the single rotating units 41, 42 is referred to herein as a parallel position. A position (distance and/or angle position) which differs from the parallel position is referred to herein as a pivoted position.

Figure 9:
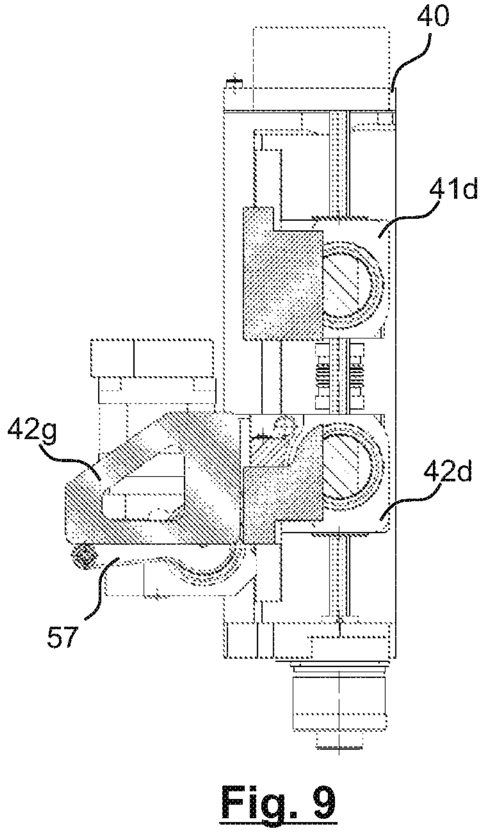
FIG. 9 shows a partially cut away view from above of the untwisting unit, in a parallel position.
Figure 10:
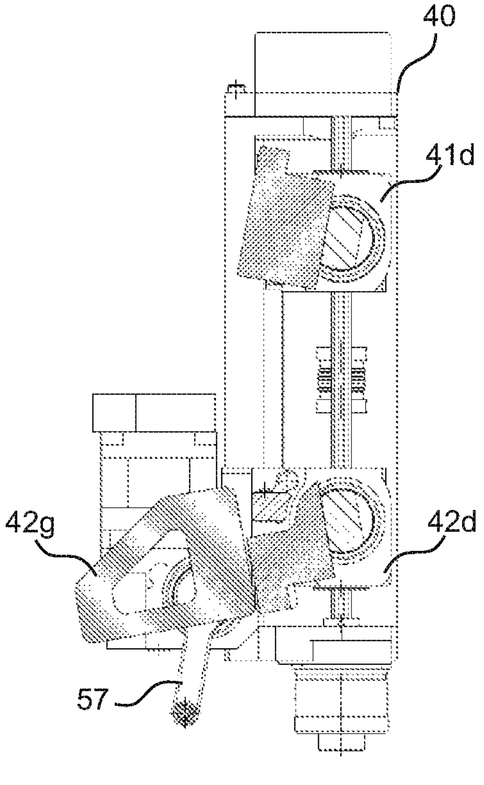
FIG. 10 shows a partially cut away view from above of the untwisting unit, in a pivoted position.

FIG. 9 and FIG. 10 each show a partially cut away view from above of the untwisting unit 40. In FIG. 9, the housing supports 41*c*, 42*c* of the single rotating units 41, 42 are in the parallel position shown in a perspective view in FIG. 8. In FIG. 10, the housing supports 41*c*, 42*c* of the single rotating units 41, 42 are in a pivoted position.

A stop element 42*g*, for example a stop plate, is fastened to one of the spindle housings 41*b*, 42*b*, for example to the second spindle housing 42*b*. A movable stop 57 is fastened to one of the parts of the untwisting unit 40 which is fixed in position opposite the spindle housings 41*b*, 42*b*, for example to the support housing 42*d*. The movable stop 57 limits the value by which the respective single rotating unit can be pivoted in that it provides a stop surface for the stop element 42*g* of the spindle housing 42*b*. As a result, the angle α is limited by the coupling of the single rotating units 41, 42 via the above-described gear mechanism.

The movable stop 57 is adjustable, for example by means of electric motor. To obtain the parallel position shown in FIG. 8 and FIG. 9, the movable stop 57 is adjusted correspondingly so that the single rotating units 41, 42 assume the parallel position. During the twisting process, the movable stop 57 is adjusted appropriately such that pivoting is possible but the pivoting is limited such that the tips 41*g*, 42*g* of the single rotating grippers 41*a*, 42*a* do not touch one another or come too close to one another.

Figure 11:
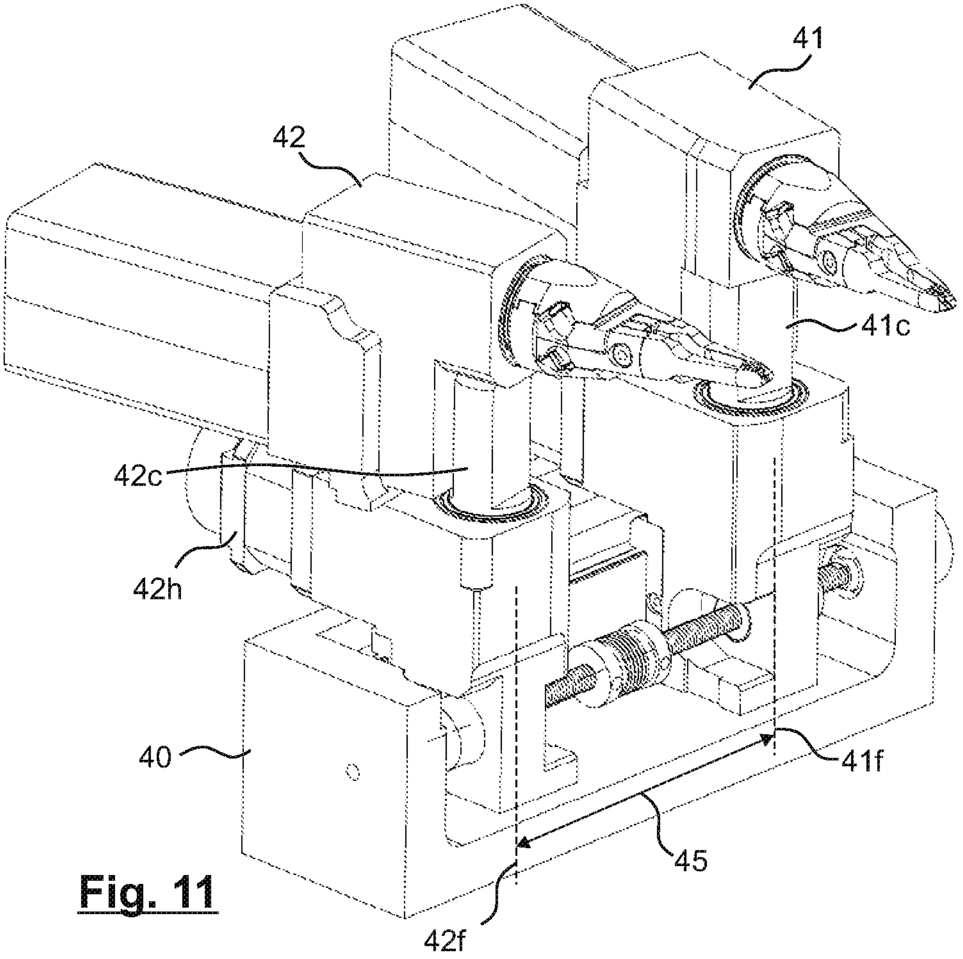
FIG. 11 shows an untwisting unit in a variant with a pivot drive.

FIG. 11 shows an untwisting unit 40 in a variant with a pivot drive 42*h* for the controlled pivoting of the housing support 42*c*. Not shown in FIG. 11 but present is a pivot drive 41*h* for the controlled pivoting of the housing support 41*c*. Each pivot drive 41*h*, 42*h* has, for example, an electric motor and a gear to pivot the associated housing support 41*c*, 42*c* about the pivot axes 41*f* and 42*f*, respectively. The distance 45 is adjusted as in the variant presented above with reference to FIG. 6 to FIG. 10. However, by means of the controlled pivotability, the pivoting is likewise limited such that the tips 41*g*, 42*g* of the single rotating grippers 41*a*, 42*b* do not touch one another or come too close to one another during a twisting process. The parallel position can be defined in a targeted manner by means of the controlled pivotability.

Figure 12:
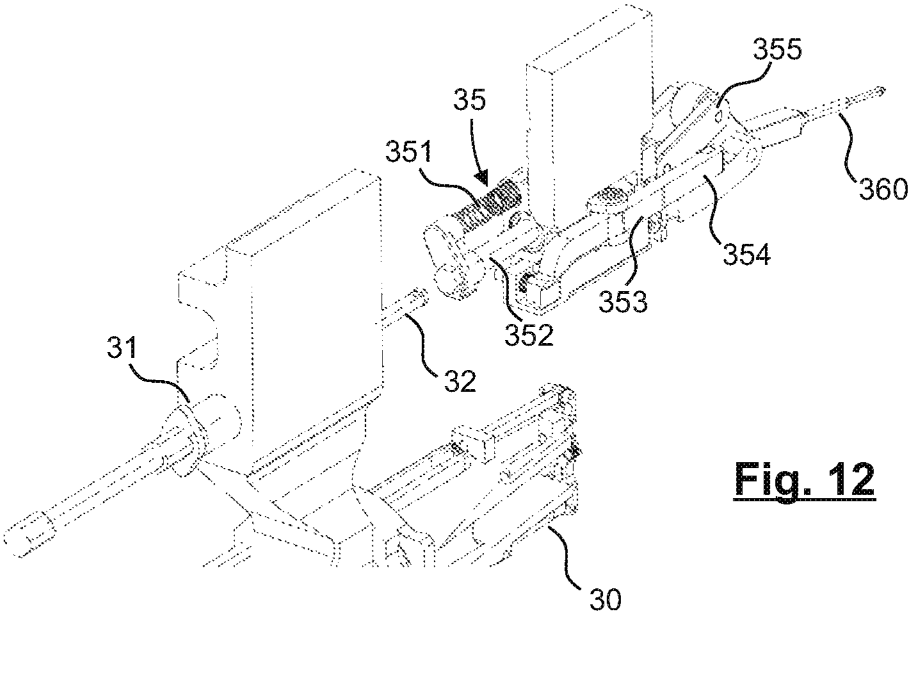
FIG. 12 shows a schematic perspective diagram of the guiding apparatus and a part of the twisting unit.

FIG. 12 shows a schematic perspective diagram of the guiding apparatus 35 and a part of the twisting unit 30. An operating apparatus 31 with a clamping cylinder 32 which can be moved in parallel is provided on the twisting unit 30. The clamping cylinder 32 is positioned on the twisting unit 30 since the positioning of the twisting unit depends on the cable length.

The guiding apparatus 35 has a guiding mandrel 360, which is used to separate and guide the single cables 11, 12 during a twisting process. The cable ends 15, 16 of the single cables 11, 12 which are clamped into the single rotating units 41, 42 are clamped individually at this end and thus not in a rotationally fixed manner. Without the guiding apparatus 35 there is no predictable lay length. The guiding apparatus 35 is displaceable in the direction x (see FIG. 3) during the twisting process. When the guiding mandrel 360 separates the single cables 11, 12 during the twisting process and the guiding apparatus 35 is moved correspondingly, the lay length a2 can thus be kept substantially constant or even varied in a controlled manner. The displacement movement of the guiding apparatus 35 takes place in coordination with the rotation speed of the twisting apparatus 30 in order to obtain a desired lay length a2.

The guiding apparatus 35 is designed such that the guiding mandrel 360 is movable out of the twisting axis V, for example can be pivoted out of the twisting axis V.

Advantageously, the guiding mandrel 360 is moved out of the twisting axis V when the guiding apparatus 35 is moved towards the twisting apparatus 30 before completion of a twisting process.

In the structure shown in FIG. 12, the guiding apparatus 35 has a clamping element 352, a clamping spring 351, a locking rocker 353, a pawl 354 and a toggle lever 355. The guiding mandrel 360 is mounted pivotably in the guiding apparatus 35 such that it is pivotable out of the twisting axis V by operating the toggle lever 355. The operating direction of the toggle lever corresponds to the direction in which the clamping element 352 can be displaced. The clamping element 352 is arranged such that it can interact with the clamping cylinder 32 when there is a corresponding distance between the twisting unit 30 and the guiding apparatus 35. In other words: When there is a corresponding distance between the twisting unit 30 and the guiding apparatus 35, the clamping element 352 of the guiding apparatus 35 can be operated by means of the clamping cylinder 32 of the twisting unit.

FIG. 12 shows an initial position in which the guiding mandrel 360 is in the position pivoted out of the twisting axis V. Operation of the clamping element 352 towards the toggle lever 355 causes the toggle lever 355 to pivot the guiding mandrel 360 into the twisting axis V in order finally to assume a twisting position, which is mentioned further below. Operation takes place counter to the preloading force of the clamping spring 351. The pawl 354 and the locking rocker 353 cause the guiding mandrel 360 to latch into the twisting position.

Figure 13:
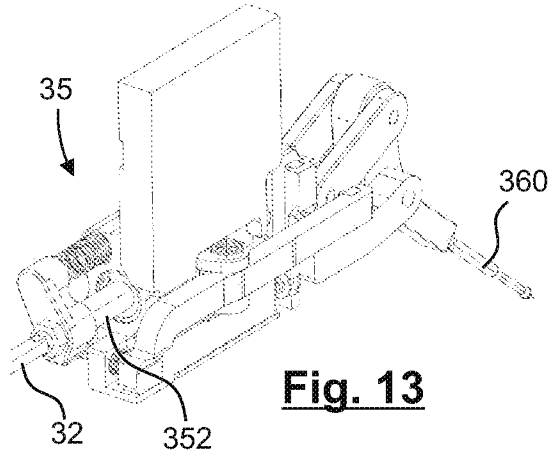
FIG. 13 shows the guiding apparatus with a guiding mandrel in an intermediate position.

FIG. 13 shows the guiding apparatus 35 with the guiding mandrel 360 in an intermediate position. In the intermediate position, the guiding apparatus 35 is moved in the direction of the twisting unit 30. The clamping cylinder 32 causes the clamping element 352 to stay still and the movement of the guiding apparatus 35 counter to the stationary clamping cylinder 32 to pivot the guiding mandrel 360 via the toggle lever 355.

Figure 14:
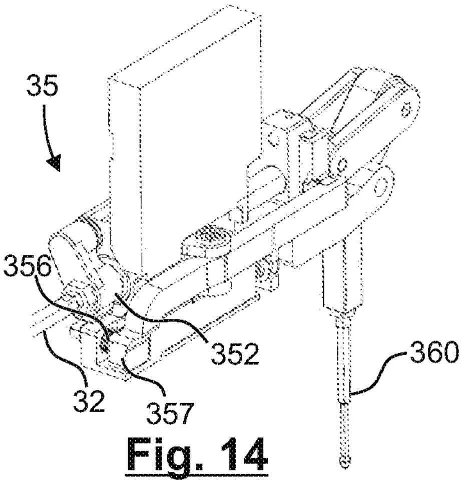
FIG. 14 shows the guiding apparatus with the guiding mandrel in a twisting position.
Figure 15:
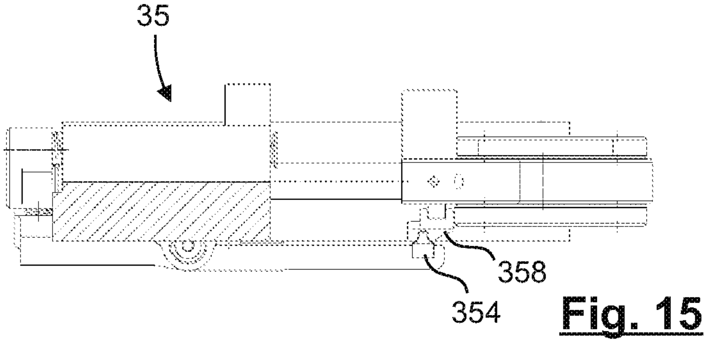
FIG. 15 shows the guiding apparatus in a side view.

FIG. 14 shows the guiding apparatus 36 with the guiding mandrel 360 in a twisting position in which it is pivoted into the twisting axis V between the single cables 11, 12 to be twisted. FIG. 15 shows the guiding apparatus 35 in a side view. Before the twisting position shown in FIG. 14, the pawl 354 has run over a latching piece 358 and latched in. The locking rocker 353 is spring-loaded by means of a spring 356. When a point 357 is operated, the lock is undone again.

After the position shown in FIG. 14 has been assumed, the clamping cylinder 32 is retracted. The guiding mandrel 360 remains in the twisting position shown in FIG. 14. Then the guiding apparatus 35 can be brought closer to the twisting unit 30.

Figure 16:
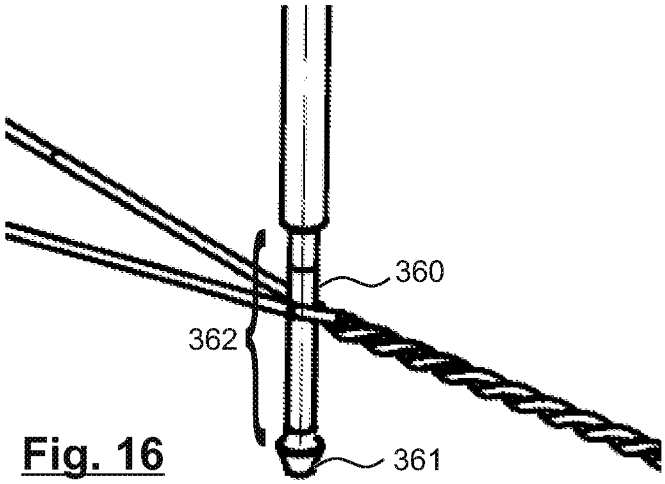
FIG. 16 shows the guiding mandrel in a detail view.

FIG. 16 shows the guiding mandrel 360 in a detail view. The guiding mandrel 360 has a thickened portion 361 on the side opposite its fastening to the guiding apparatus 35. In the case of a guiding mandrel 360 with a circular cross-section, the guiding mandrel accordingly has a larger diameter at least in some sections in the region of the thickened portion 361. The guiding mandrel 360 is likewise thickened up the shaft, for example by means of a larger diameter in the case of a circular cross-section. A guiding region 362 is formed between the two thickened portions. The single cables 11, 12 are in contact with the guiding region 362 during a twisting process. Such a geometry can help effectively to prevent oscillation processes of the single cables 11, 12, in particular when long cables in the range of over five meters, preferably over seven meters, are twisted.

Figure 17:
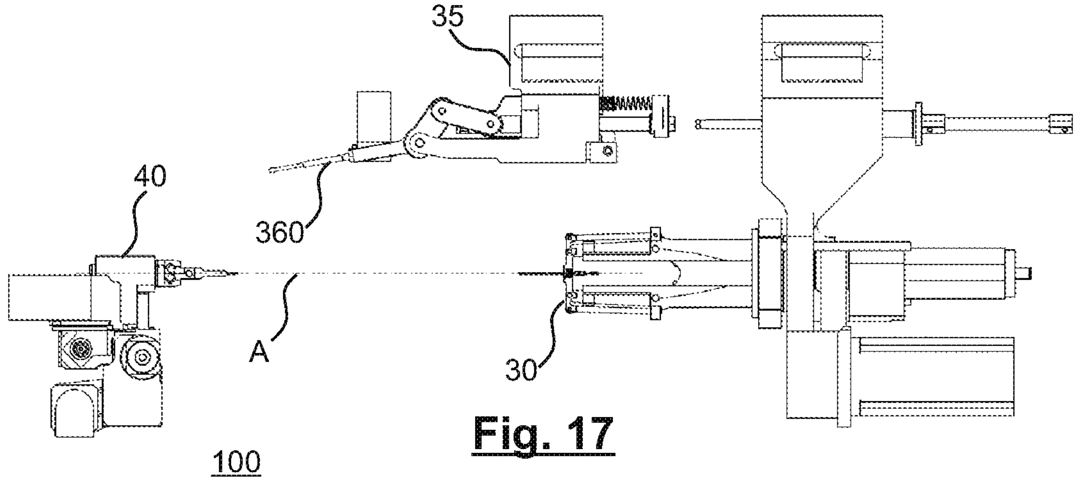
FIG. 17 shows the constituents of the device 100 in an initial position before a twisting process.

FIG. 17 shows the constituents of the device 100 in an initial position before a twisting process. The extended, finished single cables 11, 12 are clamped into the respective elements of the untwisting unit 40 and the twisting unit 30. The untwisting grippers 41*a*, 42*a* are in the parallel position at the corresponding defined distance 45. The guiding mandrel 360 is outside the extension axis A. After transfer of the single cables 11, 12, the twisting unit 30 moves away from the untwisting unit 40 somewhat in order to stretch the single cables 11, 12.

Figure 18:
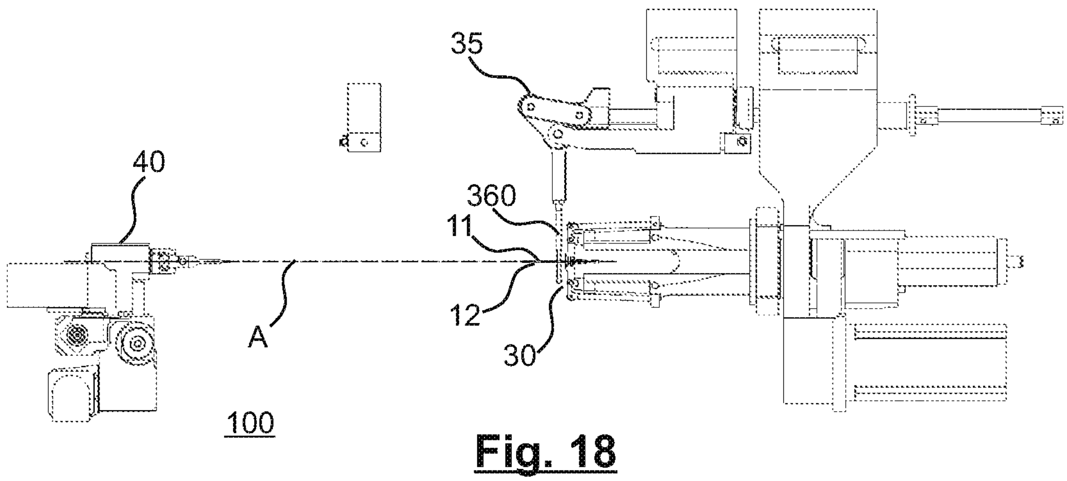
FIG. 18 shows the constituents of the device 100 in a starting position of a twisting process.

Then the guiding apparatus 35 is moved in the direction of the twisting unit 30. The clamping cylinder 32 is retracted so that the guiding apparatus 35 can be brought very close to the twisting unit 30. This position is shown in FIG. 18 and is referred to as the starting position. The guiding mandrel 360 is pivoted into the extension axis A and separates the twisting region, in which the twisting of the single cables 11, 12 takes place and the twisted cable bundle 10 is produced (to the right of the guiding mandrel 360 in the drawings), from the untwisted region (to the left of the guiding mandrel 360 in the drawings).

Figure 19:
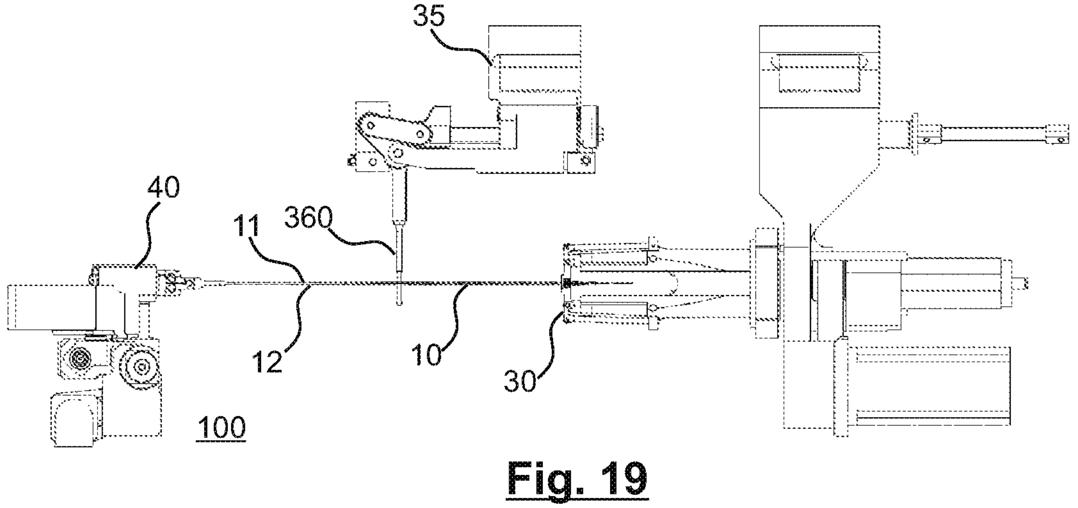
FIG. 19 shows the constituents of the device 100 in an intermediate position.

The twisting process begins in that the twisting unit 30 rotates and twists the single cables 11, 12 to form the cable bundle 10. The single rotating units 41, 42 ensure by means of their rotation that the single cables are not torsioned in themselves, i.e., about their respective cable axis v1, v2. During the twisting process, the guiding apparatus 35 moves at a controlled speed in the direction of the untwisting unit 40, wherein the controlled speed results from the rotation speed of the twisting unit 30 and the desired lay length a2. The twisting unit 30 is likewise moved minimally towards the untwisting unit 40 in order to compensate the twisting-induced shortening of the twisted cable bundle 10. This movement can take place with controlled tensile force, for example. Particularly with long cables of more than 5 meters, in particular more than 7 meters, the thickened portion 361 on the guiding mandrel 360 reduces the vertical oscillation of the cables 11, 12 and thus improves the quality of the twisting process. FIG. 19 shows an intermediate position which is assumed after the start of the twisting process and before completion of the twisting process.

Figure 20:
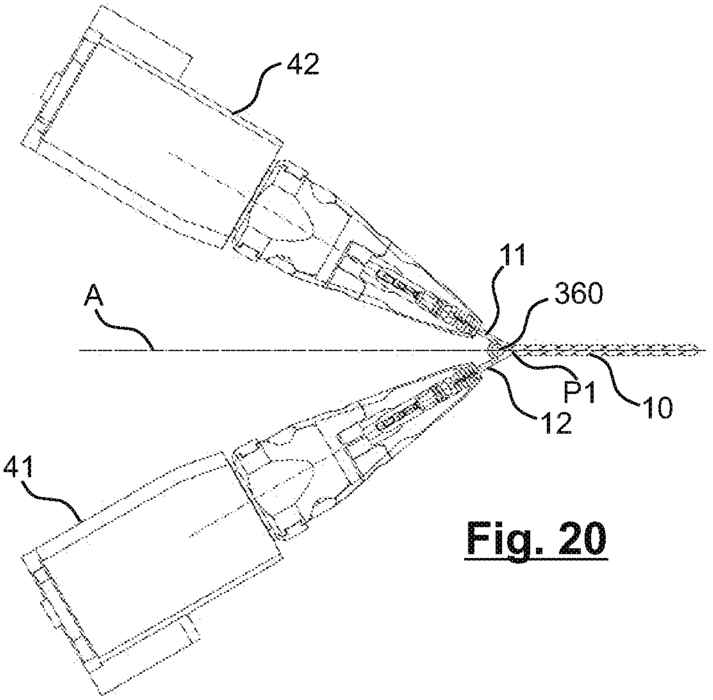
FIG. 20 shows a view from above of the single rotating units shortly before completion of the twisting process, with contact of the guiding mandrel.
Figure 21:
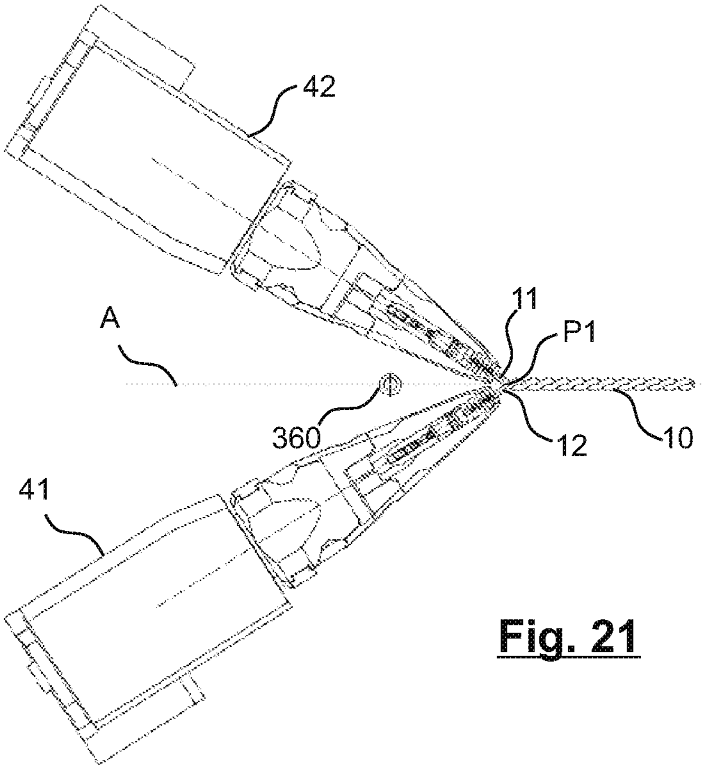
FIG. 21 shows a view from above of the single rotating units shortly before completion of the twisting process, without contact of the guiding mandrel.

FIG. 20 and FIG. 21 each show a view from above of the single rotating units 41, 42 shortly before completion of the twisting process. In FIG. 20, the guiding mandrel 360 is still in contact with the single cables 11, 12. To bring the first intersection point P1 even closer to the cable ends of the single cables 11, 12, the guiding apparatus 35 moves the guiding mandrel 360 further, so that it loses contact with the single cables 11, 12, as shown in FIG. 21. In FIG. 21, the distance 45 between the single rotating units 41, 42 has additionally been reduced further. The actual twisting process is complete. A final twisting process follows, in which the twisting unit 30 is again rotated in the twisting direction, wherein the first intersection point P1 is guided even closer to the conductor ends.

The twisting process and the subsequent final twisting process are then complete, and the fully twisted cable assembly is released from the twisting unit 30 and the single rotating units 41, 42 and, for example, dropped into a cable trough 160 (see FIG. 4). Before release, the no longer rotating twisting unit 30 can be moved further in the direction of the untwisting unit 40 in order to relax the twisted cable bundle. In this case, the angle position of the single rotating units 41, 42 can be blocked by operating the brake 53.

Figure 22:
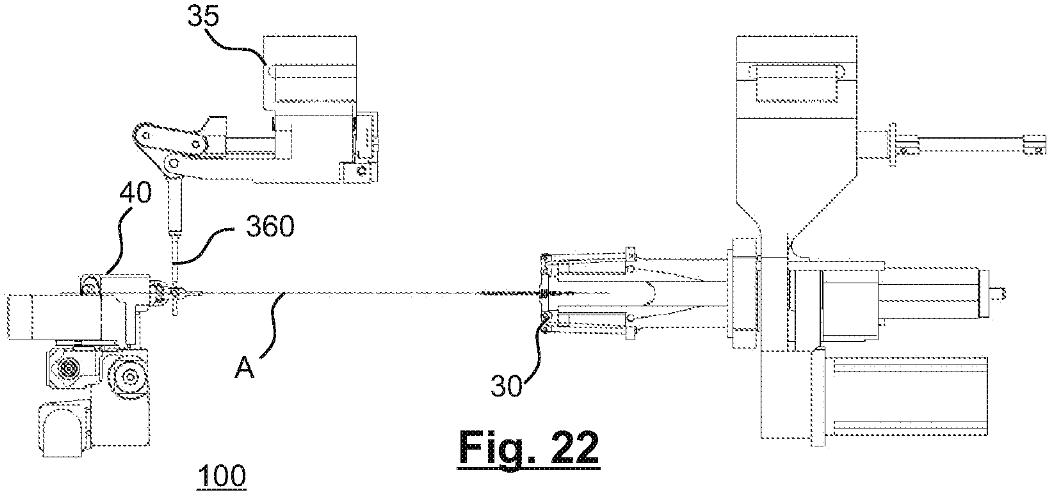
FIG. 22 shows the elements of the device in a position in which the guiding apparatus has continued its linear movement until the guiding mandrel has reached approximately the cable ends.
Figure 23:
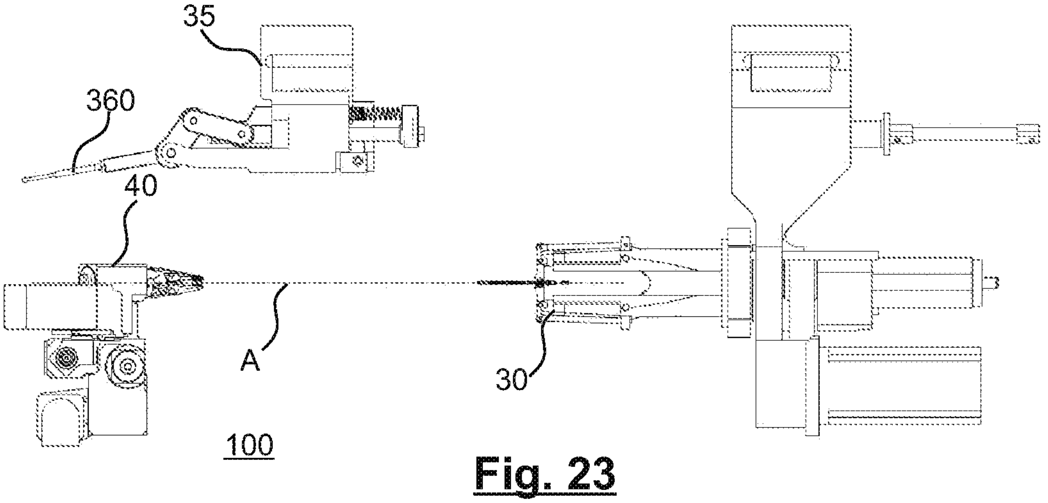
FIG. 23 shows a view analogous to FIG. 22 with a position of the guiding mandrel outside the extension axis A.

FIG. 22 shows the elements of the device 100 in a position in which the guiding apparatus 35 has continued its linear movement until the guiding mandrel 360 has reached approximately the cable ends. Now an unlocking cylinder (not shown) operates the point 357, as a result of which the guiding mandrel 360 pivots into the position, shown in FIG. 23, outside the extension axis A owing to the released spring force. The guiding apparatus 35 can then be moved to the initial position without the guiding mandrel 360 interfering with this movement.

Although only a few embodiments of the present invention have been shown and described, it is to be understood that many changes and modifications may be made thereunto without departing from the spirit and scope of the invention.

What is claimed is:

1. A device (100) for twisting single cables (11, 12) about a twisting axis (V) to form a cable bundle (10) along an extension axis (A), the device comprising:

- single rotating units (41, 42), which are spaced from one another at a variable distance (45), for separately holding cable ends (15, 16) at one end of the single cables (11, 12), wherein each single rotating unit (41, 42) is mounted rotatably about an associated pivot axis (41*f*, 42*f*), wherein each pivot axis (41*f*, 42*f*) runs substantially perpendicular to the extension axis (A) of the cable bundle (10);
- a twisting unit (30) for holding and twisting cable ends at the other end of the single cables (11, 12); and
- a distance-adjusting apparatus (50) for adjusting the variable distance (45).

2. The device (100) according to claim 1, wherein the single rotating units (41, 42) are mechanically coupled such that a pivot angle ($\alpha$) resulting between the single rotating units (41, 42) is substantially always formed equally by the single rotating units (41, 42).

3. The device (100) according to claim 2, which further comprises an adjustable movable stop (57) for a stop element (42*g*) provided on at least one of the single rotating units (41, 42), wherein the device (100) is configured such that the movable stop (57) is defined to limit the pivot angle ($\alpha$) such that contact between elements (41*g*, 42*g*) of the single rotating units (41, 42) at a given distance (45) between the single rotating units (41, 42) is prevented.

4. The device (100) according to claim 3, wherein the device (100) is configured such that the movable stop (57) is defined for the assumption of a parallel position of the single rotating units (41, 42).

5. The device (100) according to claim 1, wherein a separate pivot drive (41*h*, 42*h*) for the controlled definition of a pivot angle ($\alpha$) resulting between the single rotating units (41, 42) is provide for each single rotating unit (41, 42).

6. The device (100) according to claim 5, wherein the device is designed such that it actuates the pivot drives (41*h*, 42*h*) such that the pivot angle ($\alpha$) is formed substantially always equally by the single rotating units (41, 42).

7. The device (100) according to claim 1, which further comprises a control apparatus (200) for the program-controlled and/or user-controlled definition of the variable distance (45).

8. The device (100) according to claim 7, wherein the control apparatus (200) is configured such that it further reduces the variable distance (45) between the single rotating units (41, 42) in order to carry out a final twisting process.

9. A method for twisting single cables (11, 12) about a twisting axis (V) to form a cable bundle (10) along an extension axis (A), the device (100) according to claim 1 being used to carry out the method, the method comprising:

- separately holding cable ends (15, 16) at one end of the single cables (11, 12) by means of the single rotating units (41, 42);
- holding cable ends at the other end of the single cables (11, 12) by means of the twisting unit (30);
- rotating the twisting unit (30) to carry out a twisting process; and
- adjusting the variable distance (45) by means of the distance-adjusting apparatus (50).

10. The method according to claim 9, which comprises, before the separate holding of the cable ends (15, 16):

- bringing the single rotating units (41, 42) into a predefined distance (45) from one another, and pivoting the single rotating units (41, 42) into a parallel position;
- receiving the cable ends (15, 16) at the single rotating units (41, 42).

11. The method according to claim 9, wherein the adjusting of the variable distance (45) during the twisting process comprises reducing the variable distance (45).

12. The method according to claim 11, wherein the reducing of the variable distance (45) is continued after completion of the twisting process in order to carry out a final twisting process.

* * * * *